Nov. 29, 1938.  J. W. THOMPSON  2,138,311
TRACTOR
Filed Oct. 26, 1937  3 Sheets-Sheet 1
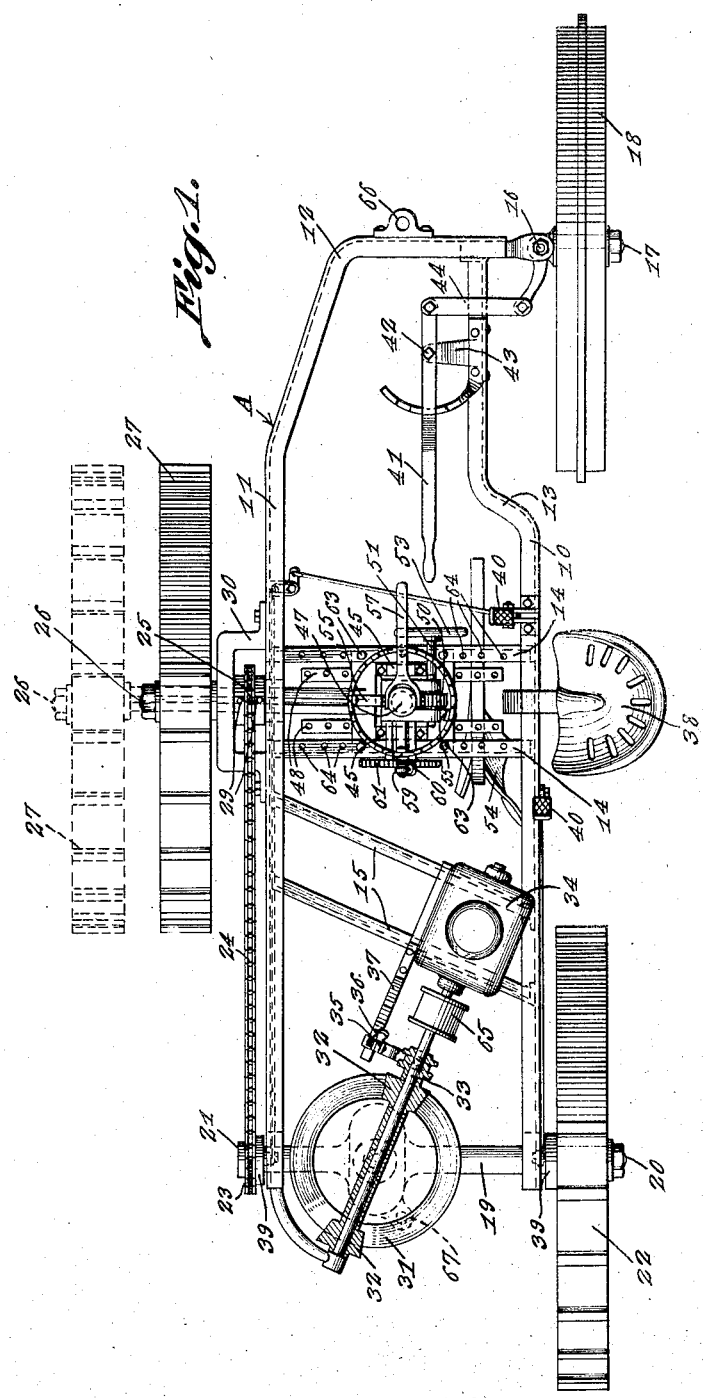
John W. Thompson, INVENTOR
BY Victor J. Evans & Co.
ATTORNEYS

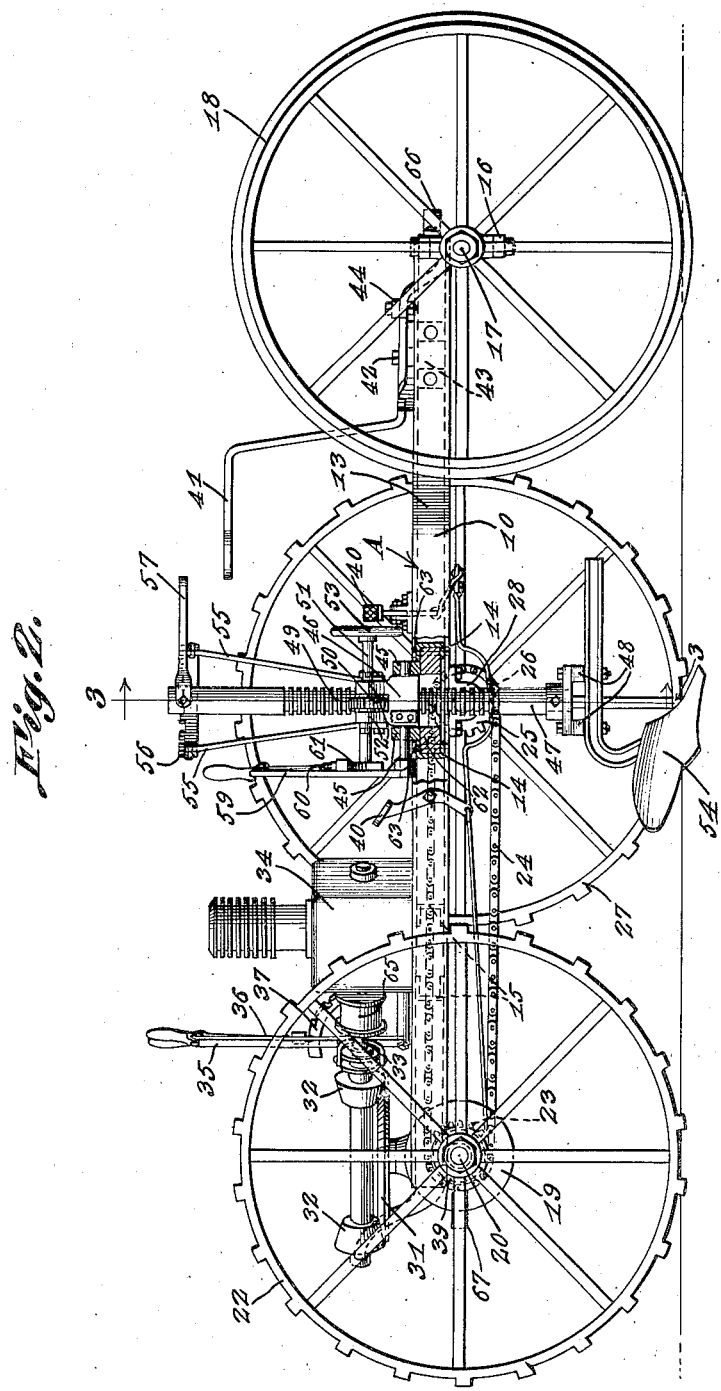

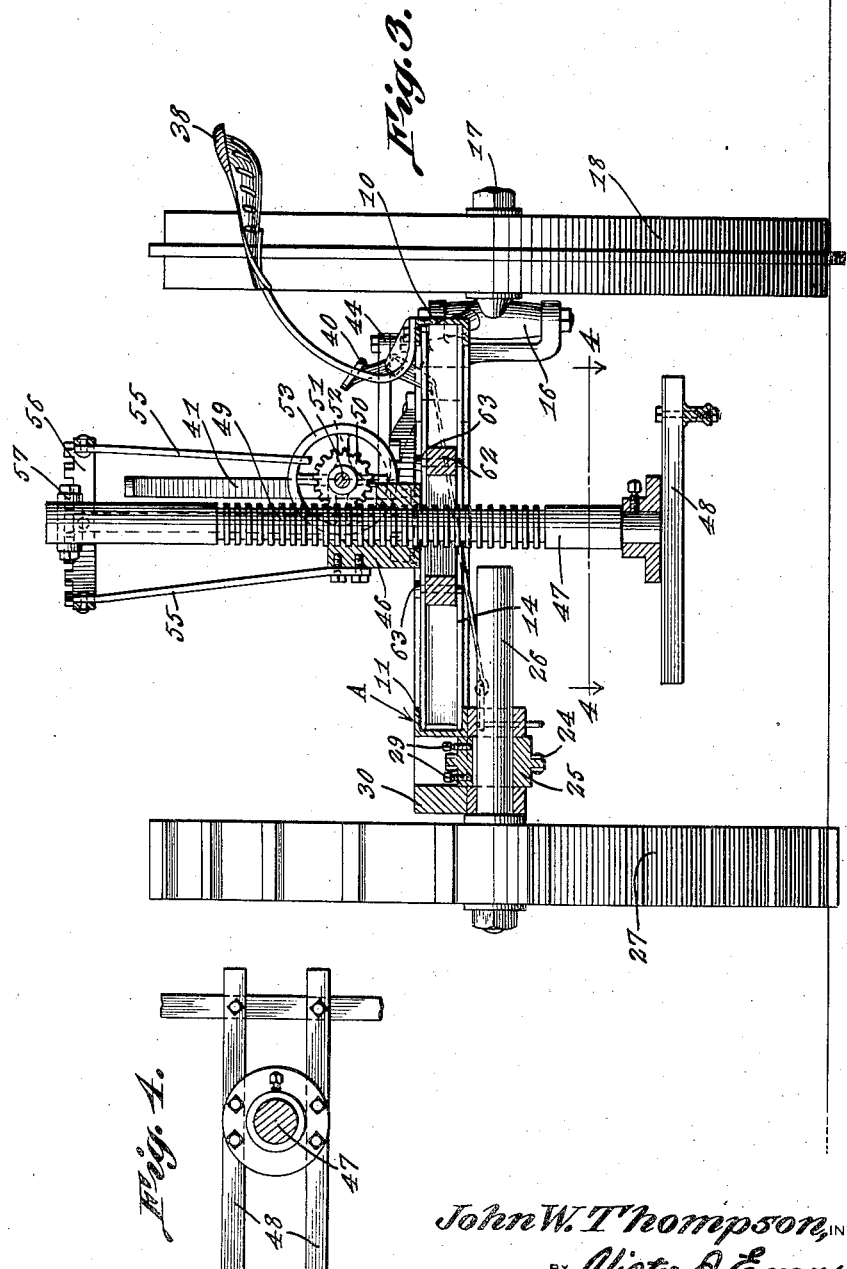

Patented Nov. 29, 1938

2,138,311

UNITED STATES PATENT OFFICE 2,138,311

TRACTOR

John W. Thompson, Clanton, Ala.

Application October 26, 1937, Serial No. 171,107

8 Claims. (Cl. 97—24)

The invention relates to a tractor and more especially to agricultural implement carrying tractors.

The primary object of the invention is the provision of a tractor of this character, wherein a ground working implement is supported intermediate with respect to the ground wheels of said tractor and is susceptible of adjustment vertically and in a horizontal path thus enabling the ground working implement to be turned without requiring the turning of the tractor so that the soil can be worked back and forth in a substantially straight path throughout a field and in this fashion relieving the necessity of the turning of the tractor when reaching the end of a furrow, hill or the like, for example, in plowing the soil.

Another object of the invention is the provision of a tractor of this character, wherein different kinds of ground working implements can be associated therewith for activity in agricultural work and said tractor is equipped with a power unit and an associated reversing mechanism so that the tractor can move in reverse directions without necessitating the turning of such tractor when in operation, the said tractor being equipped with steering wheels at both ends thereof and when it is required to be turned, this can be had in minimum area, the tractor in its entirety being of novel construction.

A further object of the invention is the provision of a tractor of this character, wherein a ground working implement associated therewith is susceptible of adjustment for reversing the same at the will of the operator of such tractor.

A still further object of the invention is the provision of a tractor of this character, wherein the traction wheels are arranged in a novel manner so that the said tractor can be turned in the least possible space and also the lateral spread of such tractor changed in conformity with the requirements for so doing.

A still further object of the invention is the provision of a tractor of this character, which is simple in its construction, compact in the make-up thereof, thoroughly reliable and efficient in operation, susceptible of use with varying types of ground working implements for agricultural activity, affording a draft medium for varying loads, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a top plan view of a tractor constructed in accordance with the invention.

Figure 2 is a vertical longitudinal sectional view thereof.

Figure 3 is a sectional view taken on the line 3—3 of Figure 2 looking in the direction of the arrows.

Figure 4 is a sectional view on the line 4—4 of Figure 3 looking in the direction of the arrows.

Similar reference characters indicate corresponding parts throughout the several views in the drawings.

Referring to the drawings in detail, the tractor constituting the present invention comprises a chassis A involving opposed longitudinally directed side sills 10 and 11, respectively, which at one end of the chassis are joined with each other, this being brought about by the bend 12 in the sill 11 and the inwardly directed bight 13 in the sill 10 while the opposite end of said chassis is open. Intermediate of the ends of the chassis A are the straight spaced transversely arranged cross sills 14 and the diagonally disposed spaced cross sills 15, respectively, these being unitary with the side sills 10 and 11 effected in any manner. Arranged in association with the bend 12 of the sill 11 is a turning knuckle 16 for an axle 17 on which is journaled a traction wheel 18 while disposed at the open end of the chassis A and fitted with the side sills 10 and 11 thereof is a differential gearing and axle housing 19, the differential gearing being not shown, while the axles in association therewith are indicated at 20 and 21, respectively. The axle 20 has fixed thereto a traction wheel 22 located at the same side of the chassis A as the wheel 18 while the axle 21 has fixed thereto a sprocket pinion 23 over which is trained an endless sprocket chain 24, this being also trained over a sprocket gear 25 adjustably fixed to a wheel axle 26 carrying a traction wheel 27 being also fixed thereto and arranged on the opposite side of the chassis A with respect to the wheels 18 and 22. The axle 26 is slidably fitted in bearings 28 upon the chassis A for lateral adjustment therein. The sprocket gear 25 carries set screws 29 engaging the axle 26 for adjustment with relation to each other and this sprocket gear 25 is loosely confined within a holding yoke 30 carried by the chassis A. The wheel 27 can be spread by separation a limited distance from the chassis A thereby increasing the spread or traction gauge of the tractor.

Coacting in association with the differential gearing within the housing 19 are reversing frictional gearing connections 31 and 32, respectively, with a power shaft 33 of a power unit 34, preferably an internal combustion engine, mounted upon the cross sills 15. The connections 32 are reversed through the action of a reversing lever 35 releasably latched at 36 with a keeper rack 37 suitably built on the chassis. Thus the tractor can be driven in reverse directions without necessitating the turning of said tractor. The lever 35 is manually controlled and is in convenient reach of an operator's seat 38 on the chassis A, being located midway thereof.

The axles 20 and 21 have associated therewith braking mechanism 39 operative from foot levers 40, these being convenient to an operator when occupying the seat 38 and in this manner through alternate application of the braking mechanism 39 to the respective axles 21 and 20 the tractor in its entirety can be turned in the least possible space.

The knuckle 16 has connection with a steering lever 41 pivoted at 42 to a bracket 43 on the chassis A, the link connection between the lever 41 and the knuckle 16 being indicated at 44 and thus on the throwing of the lever 41, the wheel 18 can be turned in the required direction for the steering of the tractor and the turning thereof. This lever 41 is in convenient reach of the occupant of the seat 38. Trunnioned for lateral vertical swinging movement in bearings 45 is a saddle 46 in which is fitted an upstanding stem 47 forming a hanger to which is detachably connected a carrier head 48 for a ground working implement. This stem is provided with a circular toothed rack 49 meshing with a rack gear 50, its turning arbor 51 being journaled in bearings 52 on the saddle 46 and is equipped with a handle wheel 53 for manual adjustment of the said stem 47 in the saddle 46 whereby said stem may be raised or lowered for regulating the implement fitted to the carrier 48, in this instance being a moldboard plow 54.

Fixed to and rising from the saddle 46 is a stand 55 provided at its upper end with an annular keeper rack 56 while mounted on the upper end of the stem 47 is a vertically swinging turning lever 57 selectively engageable with the rack 56 and on release of the lever 57 from said rack the stem 47 can be turned thereby turning the implement 54 without necessitating the turning of the tractor for such purpose. The lever 57 when engaging the rack 56 latches the stem 47 against turning movement.

Fixed to one of the trunnions 58 is a throw lever 59 having a latch 60 engageable with the keeper 61 and this lever 59 when thrown works the saddle 46 to dispose the implement 54 at an angle to the ground surface as may be required.

The sills 14 adjustably support a bed 62 on which are carried the bearings 45 for the trunnions of the saddle 46 and this bed 62 is laterally shiftable for changing the position of the implement 54 laterally with respect to the chassis A and such bed is held in adjusted position by removable pins 63 selectively engageable in holes 64 provided in the sills 14 and thus such implement 54 can be located at the longitudinal center or to either side thereof of the chassis A.

The power shaft 33 carries a power take-off pulley 65 for operating machinery or the like when the tractor is at a standstill.

The closed end of the chassis A has a hitch 66 while the housing 19 has a hitch 67, respectively, so that machinery can be attached and placed under draft by the tractor when desired.

The wheel 27 is arranged medially with respect to the wheels 18 and 22, the latter being at one side of the chassis A while the wheel 27 is at the other side thereof.

The tractor in its construction can be put to many uses and is susceptible of association with different kinds of ground working implements for the draft and operation of the same in agricultural pursuits or for roadwork in scraping or leveling the same.

On vertical adjustment of the implement 54, the depth of ground activity thereof can be regulated or the same can be elevated to an inactive position with relation to said ground.

The tractor is susceptible of wide turning or may be turned in the least possible space.

What is claimed is:

1. A tractor of the kind described comprising a chassis, wheels fitted with the chassis, means for transmitting power to certain of the wheels, means for reversing the direction of travel of the powered wheels, means for steering other of said wheels, a turnable implement carrier intermediate of said chassis, means for turning said carrier, means for raising and lowering the carrier, and means for lateral swing of said carrier.

2. A tractor of the kind described comprising a chassis, wheels fitted with the chassis, means for transmitting power to certain of the wheels, means for reversing the direction of travel of the powered wheels, means for steering other of said wheels, a turnable implement carrier intermediate of said chassis, means for turning said carrier, means for raising and lowering the carrier, means for lateral swing of said carrier, and means for actuating the latter.

3. A tractor of the kind described comprising a chassis, wheels fitted with the chassis, means for transmitting power to certain of the wheels, means for reversing the direction of travel of the powered wheels, means for steering other of said wheels, a turnable implement carrier intermediate of said chassis, means for turning said carrier, means for raising and lowering the carrier, means for lateral swing of said carrier, means for actuating the latter, and means for locking the carrier against swing and in vertically adjusted positions.

4. A tractor of the kind described comprising a chassis, wheels fitted with the chassis, means for transmitting power to certain of the wheels, means for reversing the direction of travel of the powered wheels, means for steering other of said wheels, a turnable implement carrier intermediate of said chassis, means for turning said carrier, means for raising and lowering the carrier, means for lateral swing of said carrier, means for actuating the latter, means for locking the carrier against swing and in vertically adjusted positions, and brake mechanism coacting with the powered wheels.

5. A tractor of the kind described comprising a chassis, wheels fitted with the chassis, means for transmitting power to certain of the wheels, means for reversing the direction of travel of the powered wheels, means for steering other of said wheels, a turnable implement carrier intermediate of said chassis, means for turning said carrier, means for raising and lowering the carrier, means for lateral swing of said carrier, means for actuating the latter, means for locking the carrier against swing and in vertically adjusted positions, brake mechanism coacting with the powered wheels, and means for moving the carrier laterally of said chassis.

6. A tractor of the kind described comprising a chassis, wheels fitted with the chassis, means for transmitting power to certain of the wheels, means for reversing the direction of travel of the powered wheels, means for steering other of said wheels, a turnable implement carrier intermediate of said chassis, means for turning said carrier, means for raising and lowering the carrier, means for lateral swing of said carrier, means for actuating the latter, means for locking the carrier against swing and in vertically adjusted positions, brake mechanism coacting with the powered wheels, means for moving the carrier laterally of said chassis, and means for adjusting one of the powered wheels in a lateral direction of the chassis relative to the other powered wheel.

7. A tractor of the kind described comprising a chassis, wheels fitted with the chassis, means for transmitting power to certain of the wheels, means for reversing the direction of travel of the powered wheels, means for steering other of said wheels, a turnable implement carrier intermediate of said chassis, means for turning said carrier, means for raising and lowering the carrier, means for lateral swing of said carrier, means for actuating the latter, means for locking the carrier against swing and in vertically adjusted positions, brake mechanism coacting with the powered wheels, means for moving the carrier laterally of said chassis, means for adjusting one of the powered wheels in a lateral direction of the chassis relative to the other powered wheel, and a differential gearing arranged between the powered wheels.

8. A tractor of the kind described comprising a chassis, wheels fitted with the chassis, means for transmitting power to certain of the wheels, means for reversing the direction of travel of the powered wheels, means for steering other of said wheels, a turnable implement carrier intermediate of said chassis, means for turning said carrier, means for raising and lowering the carrier, means for lateral swing of said carrier, means for actuating the latter, means for locking the carrier against swing and in vertically adjusted positions, brake mechanism coacting with the powered wheels, means for moving the carrier laterally of said chassis, means for adjusting one of the powered wheels in a lateral direction of the chassis relative to the other powered wheel, a differential gearing arranged between the powered wheels, and a power take-off associated with the power means.

JOHN W. THOMPSON.